United States Patent [19]

Zupanick

[11] 4,337,668
[45] Jul. 6, 1982

[54] ORIFICE WEAR COMPENSATION

[75] Inventor: Joseph E. Zupanick, Richardson, Tex.

[73] Assignee: Sun Gas Company, Dallas, Tex.

[21] Appl. No.: 213,442

[22] Filed: Dec. 5, 1980

[51] Int. Cl.³ .............................................. G01F 1/50
[52] U.S. Cl. .................................... 73/861.61; 73/86; 324/71 E
[58] Field of Search ............. 73/7, 86, 861.52, 861.61, 73/861.62; 324/71 E

[56] References Cited
U.S. PATENT DOCUMENTS

| 3,404,264 | 10/1968 | Kugler | 364/510 |
| 3,701,280 | 10/1972 | Stroman | 73/861.02 |
| 3,775,680 | 11/1973 | Egeland | 73/7 X |
| 4,305,278 | 12/1981 | Stewart et al. | 73/86 |

Primary Examiner—Charles A. Ruehl
Attorney, Agent, or Firm—J. Edward Hess; Donald R. Johnson; James H. Phillips

[57] ABSTRACT

In gas volume measurement apparatus employing an orifice plate, wear on the edges of the orifice affect its area and hence the accuracy of the volumetric measurement. In order to correct for the effects of such wear, a probe element is inserted into the same flow path as the orifice. The probe element itself wears to change a fundamental characteristic, typically resistance, which can be related to the orifice wear and thus provide a correction factor to the volumetric calculations.

10 Claims, 6 Drawing Figures

ORIFICE WEAR COMPENSATION

BACKGROUND OF THE INVENTION

This invention relates to the volumetric measurement of fluid flow and, more particularly, to means for improving the long-term accuracy of such measurements when carried out by determining the differential pressure across an in-stream precision orifice and solving a formula in which the differential pressure is a variable factor.

Accurate volumetric measurements of gas flow, such as those made in the commercial production and delivery of natural gas, are often carried out by calculations based upon the pressure differential observed across a standard orifice disposed in the gas flow stream. According to the standards established by the American Gas Association, as set forth in *Gas Measurement Committee Report No. 3 (Orifice Metering of Natural Gas)*, the gas flow rate is determined by using the formula:

$$Q_h = C' \sqrt{h_w p_f}$$

in which $Q_h$ = the quantity of flow at base conditions in cubic feet per hour
$C'$ = the orifice flow constant
$h_w$ = the differential pressure in inches of water at 60° F.
$p_f$ = the absolute static pressure in pounds per square inch The orifice flow constant is defined as the rate of flow in cubic feet per hour, at base conditions, when the extension $\sqrt{h_w p_f}$ equals one. It is calculated by the following equation:

$$C' = F_b F_r Y F_{pb} F_{tb} F_{tf} F_g F_{pv} F_m F_a F_e$$

where $F_b$ = basic orifice factor
$F_r$ = Reynold's number factor
$Y$ = expansion factor
$F_{pb}$ = pressure base factor
$F_{tb}$ = temperature base factor
$F_{tf}$ = flowing temperature factor
$F_g$ = specific gravity factor
$F_{pv}$ = supercompressibility factor
$F_m$ = manometer factor (for mercury type meters only)
$F_a$ = orifice thermal expansion factor
$F_l$ = gage location factor The values of the several factors are readily ascertainable as discussed in detail in the above-mentioned American Gas Association publication and in other standard references in the field.

It will be manifest that the orifice itself must adhere quite closely to predetermined dimensions and standards of finish in order to obtain and maintain the desired degree of accuracy in calculating the gas volumetric flow. By way of example, a number of specific criteria for the orifice are set forth in the above-referenced American Gas Association publication.

Thus, those skilled in the art will appreciate that the quality of the volumetric measurement will be a strong function of the condition of the orifice plate and in particular of the edges of the orifice itself. These edges, however, are subject to wear by erosion primarily caused by particulate matter in the flowing stream. The amount of wear on the orifice plate depends primarily on (1) the amount of particulate material in the streams; (2) the velocity of the particles; and, (3) the abrasive characteristics of the particles.

Since it is highly desirable, particularly in view of the remarkable increase in the cost of natural gas, that the measuring apparatus operate with sustained accuracy, it will be apparent to those skilled in the art that it would be highly desirable to provide means for compensating for the effects of wear to the orifice plate due to erosion.

It is therefore a broad object of my invention to provide improved means for effecting volumetric measurements of gas flowing through a conduit.

It is another object of my invention to provide means for improving the long-range accuracy of such volumetric measurements.

In a more specific aspect, it is an object of my invention to provide, in an orifice plate apparatus for measuring the rate of gas flow in a conduit, means for indirectly measuring and compensating for orifice plate wear in order to achieve long-range precision of the measuring system.

SUMMARY OF THE INVENTION

These and other objects of the invention are achieved by providing one or more probes serially in the same flow path as the orifice in such a manner that the wear on the probe will represent, in an analagous manner, the wear to the precision orifice. The probe is configured to exhibit a change in a measurable quantity, such as resistance, to compensate the volumetric measurement obtained by measuring the differential pressure across the orifice.

DETAILED DESCRIPTION OF THE INVENTION

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

Figure 1:
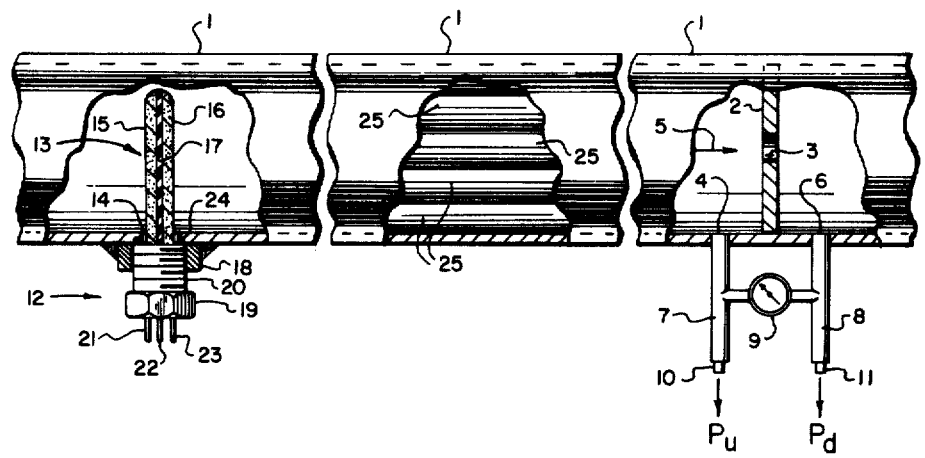
FIG. 1 is a partially cutaway representation of a pipe containing an orifice metering device employed in conjunction with a wear compensation metering probe according to the present invention.

Referring now to FIG. 1, a length of pipe 1 includes an orifice plate 2 having a standard orifice 3 disposed in the flow path of gas passing through the pipe. An opening 4 in the sidewall of the pipe 1 is positioned just upstream (with gas flowing in the direction of the arrow 5) the orifice plate 2 serves as a tap hole for obtaining an upstream pressure signal. Similarly, a second opening 6 through the pipe 1 sidewall is positioned just downstream from the orifice plate 2 and serves as a tap hole for obtaining a downstream pressure reading. Thus, the upstream pressure will appear in conduit 7 and the downstream pressure in conduit 8 such that pressure gage 9, connected across the conduits 7 and 8, will read the differential pressure across the reference orifice 3. Pressure transducers 10 and 11, respectively, develop electrical signals analagous to Upstream Pressure ($P_u$) and Downstream Pressure ($P_d$) for remote display and/or utilization of the sensed values.

Still referring to FIG. 1, a wear probe unit 12 is affixed to and extends through the sidewall of the pipe 1 upstream from the reference orifice 3. The wear probe unit 12 includes a probe section 13 which extends radially through an opening 14 in the side wall of the pipe 1. The probe section 13 includes a first resistive element 15 which faces upstream, a second resistive element 16 which faces downstream, and an insulator 17 centrally disposed, and electrically separating, the first and second resistive elements 15, 16.

As exemplary of the manner in which the probe section may be held, gas tight, in position within the pipe 1, a nut 18 may be welded to the outer wall of the pipe 1 in a position concentric to the opening 14. The probe section 13 is supported by a base section 19 which includes a threaded portion 20 adapted to threadably engage the nut 18. The base section 19 includes terminals 20, 21, and 22 which connect to the resistive elements 15 and 16 in a manner to be described in detail below. Suitable insulation means (not shown in FIG. 1) in the base section 19 of the wear probe unit 12 insulate the internal electrical connections between the terminals 21, 22, 23 and the resistive elements 15, 16. A gasket, such as o-ring 24, serves to insure the gas tight integrity of the system in the region of the wear probe unit 12.

Swirls and cross-currents set up by the probe section 13 should be eliminated before the stream impinges on the orifice plate 2. This may be accomplished by a set of straightening vanes 25 positioned in a section of the pipe 1 intermediate the probe section 13 and the orifice plate 2. The vanes preferably comprise thin-walled tubing, either welded together and properly and securely attached into the pipe 1, or mounted into two end rings small enough to slip into the pipe. Square, hexagonal, or other shaped tubing may be used in making the vanes 25. It is not necessary that all of the vane passages be of the same size, but their arrangement should be symmetrical. The condition of the fluid stream upstream from the probe unit 12 may make it appropriate to also provide a vane set (not shown) ahead of the probe unit.

Figure 2:
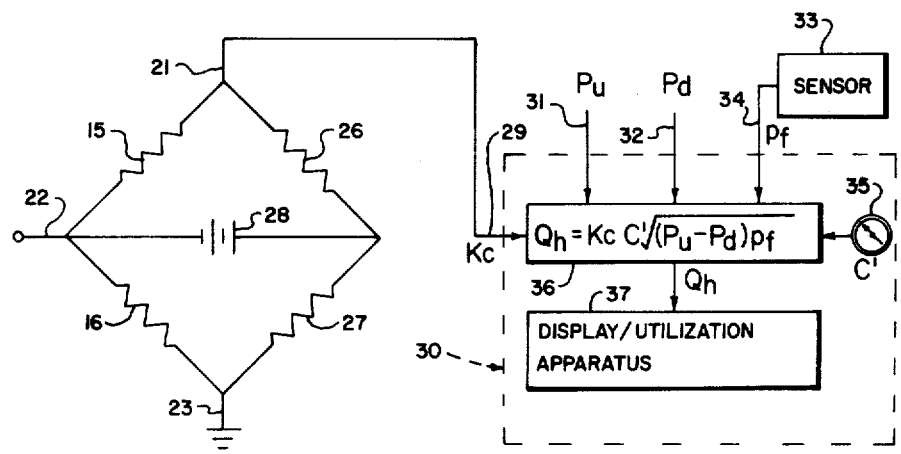
FIG. 2 is a partially schematic, simplified representation of a system for employing the compensating means of the present invention to improve the long-term accuracy of gas volumetric flow measurements employing orifice metering.

As shown in FIG. 2, the terminal 22 is electrically connected to the junction between the resistive elements 15 and 16 and also to a reference potential such as the negative electrode of a battery 28. The terminal 21 is connected to the inside (i.e., adjacent the dielectric 17) of resistive element 15 and also to one end of a resistor 26. The terminal 23 is connected to the inside (i.e., adjacent dielectric 17) of the resistance element 16 and also to one end of another resistor 27. In addition, terminal 23 is connected to ground potential. The other ends of each of the resistors 26 and 27 are connected together and to the positive electrode of battery 28. It will therefore be appreciated that the resistive elements 15 and 16 and resistors 26 and 27 comprise a d-c bridge such that the potential observed between the terminals 21 and 23 will be representative of the difference in resistance between the resistive elements 15 and 16. The resistors 26 and 27 are selected to be equal and the same (or nearly the same) as the resistive elements 15 and 16 prior to any wear taking place to the resistive elements.

Thus, it will be appreciated that a correction constant ($K_c$) indicative of the wear on the resistive element 15 (and hence analagous to the wear on the orifice plate 2 at the edges of the orifice 3) will be represented by a d-c voltage level appearing at the electrode 21 due to the consequent imbalance of the bridge. The signal $K_c$ is coupled, through line 29, to an information processing unit 30 which also receives upstream pressure information from the pressure transducer 10 (FIG. 1) on line 31, downstream pressure information from the pressure transducer 11 on line 32, and static pressure ($p_f$) information from any suitable atmospheric pressure sensor 33 on line 34. The orifice flow constant $C'$ is entered, as by dial unit 35. The $K_c$, $P_u$, $P_d$, $p_f$, and $C'$ information signals are applied to arithmetic unit 36 which calculates the volumetric flow rate according to the formula: $Q_h = K_c \ C' \sqrt{(P_u - P_d)} \ p_f$, i.e., the established formula augmented by introduction of the correction factor $K_c$ representative of the wear of the resistive element 15 which is analagous to the wear on the orifice plate 2 at the edges of the orifice 3. The quantity $Q_h$ is available to display/utilization apparatus 37 for downstream useage and/or processing. Those skilled in the art will appreciate that the manner in which the signals $K_c$, $P_u$, $P_d$, $P_f$, and $C'$ are employed to obtain and utilize the quantity $Q_h$ may actually take widely diverse forms from a simple pencil and paper calculation to interfacing with an extensive information processing system.

Figure 3:
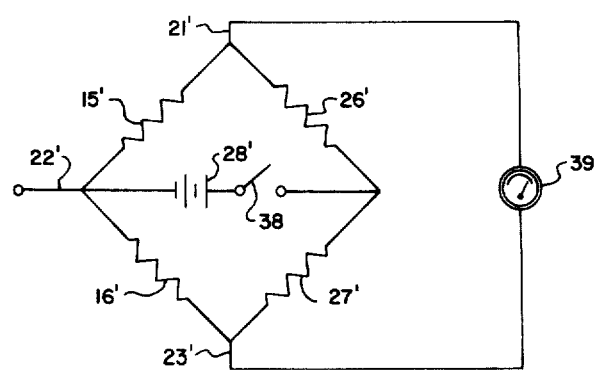
FIG. 3 is a schematic representation of a bridge circuit for obtaining a readout representative of orifice wear as measured analagously by the wear probe.

In practice, it may be found in some systems that wear to the orifice 3 and to the resistive element 15 takes place sufficiently slowly that the wear need not be continuously monitored. Referring to FIG. 3, resistive elements 15' and 16', resistors 26' and 27', battery 28' and terminal 21', and 22', and 23', all correspond to the elements identified by like unprimed numbers in FIG. 2. In the circuit of FIG. 3, a switch 38 is placed in series with the positive terminal of the battery 28' and the junction between the resistor 26' and 27'. A voltmeter 39 is electrically connected between the terminals 21' and 23'. Periodic measurement of the wear to resistive elements 15' are taken by closing the switch 38 (manually or automatically) to obtain a voltage reading on meter 39 which represents the bridge imbalance and hence the degree of wear.

Figure 4:
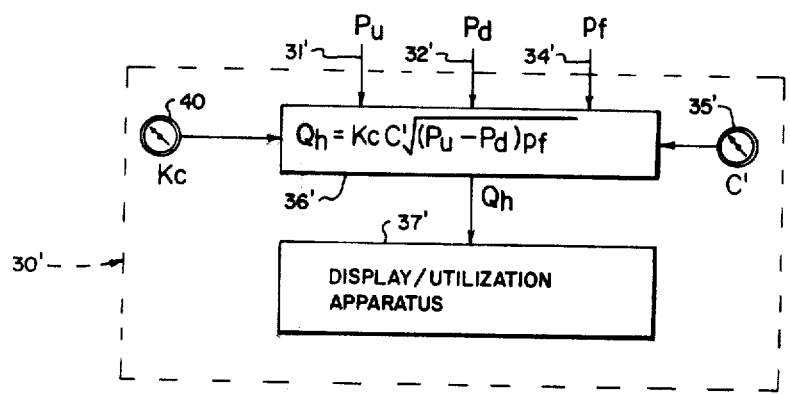
FIG. 4 is a high level schematic representation of an instrument for reading out compensated volumetric flow.

Referring now to FIG. 4, a dial unit 40 on information processing unit 30' may be employed to enter the correction factor $K_c$ which is applied to arithmetic unit 36'. The remaining elements of information processing unit 30' correspond to those in information processing units 30 in which the like elements are identified by unprimed numbers.

Figure 5:
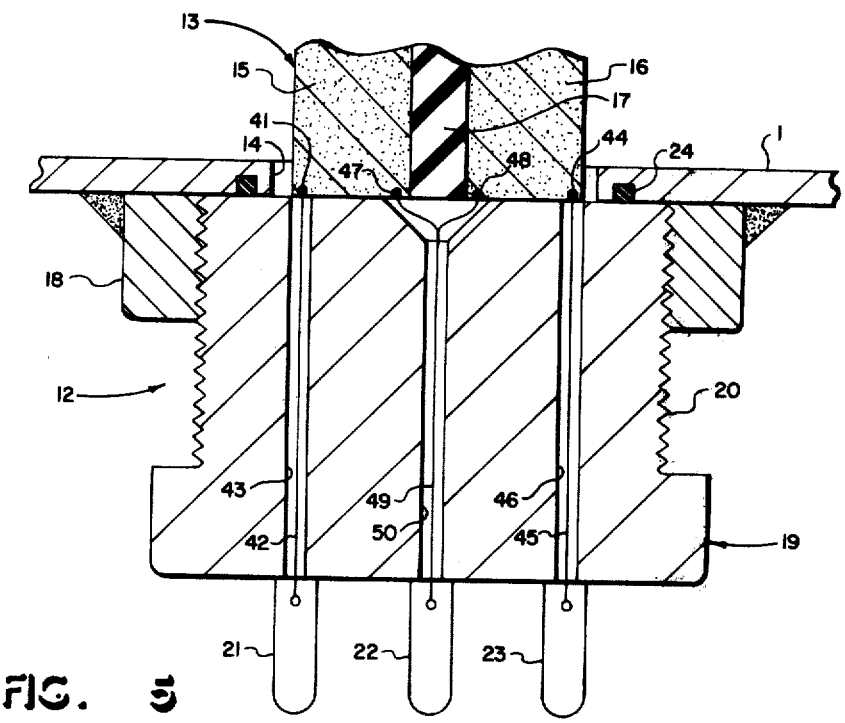
FIG. 5 is a cross-sectional detail of the probe base section taken along the lines 5—5 in FIG. 1.

FIG. 5 is an expanded, cross-sectional view of the base section 19 of the wear probe unit 12. It will be observed that the electrode 21 is connected to the outer periphery of resistive element 15 at a point 41 by a conductor 42 which passes through a channel 43 in the base section 19 of the wear probe unit 12. Similarly, the electrode 23 is connected to the outer periphery of the resistive element 16 at connection point 44 by a conductor 45 passing through a channel 46, and electrode 22 is connected to electrically common points 47 and 48 on the inner peripheries of the resistive elements 15 and 16 by a conductor 49 passing through a channel 50. Preferably, the base section 19 is fabricated from non-conducting material. If the base section 19 is fabricated from conductive material, the conductors 43, 45, and 49, the electrodes 21, 22, and 23, and the resistive elements 15, 16, may be insulated from the base section by any suitable means.

The resistive elements 15 and 16 should be fabricated from a material exhibiting a substantial resistivity in order that even relatively slight wear to the resistive element 15 will obtain a $K_c$ signal of useable level. In addition, the material from which the resistive elements 15 and 16 are fabricated should be substantially softer than the material from which the orifice plate is fabricated, this latter material typically being very hard. One useable material for the resistive elements 15, 16 which is appropriate for a range of applications is compressed graphite.

Figure 6:
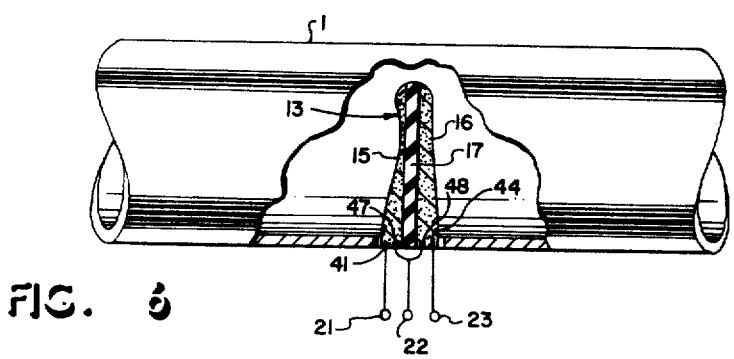
FIG. 6 is a cutaway view of a worn probe.

FIG. 6 illustrates a probe section 13 exhibiting a typical wear pattern which is very near a terminal condition indicating that the downstream orifice plate should be replaced or recalibrated to obtain a new C'. It may be noted that the resistance between electrodes 21 and 22 will have increased substantially with the wear shown in FIG. 6 since there is less volume for the electrons to flow between the connection points 41 and 47 whereas the resistance between the electrodes 22 and 23 (i.e., between the connection points 44 and 48) will remain the same, or very nearly the same, thus, substantially unbalancing the bridge circuits illustrated in FIGS. 2 and 3 to obtain the $K_c$ signal.

The magnitude of the conversion factor $K_c$ is most easily established empirically, through controlled experiments, by subjecting a test probe/orifice setup to a flow of gas into which abrasive particles have been introduced. The concentration of abrasive particles for such a test run may be very much higher than would be expected under normal operating conditions in order to obtain, within a reasonable time, the data necessary to prepare a table or set of curves relating observed and measured change in resistance of the probe's upstream resistive element to observed and measured wear to the orifice.

In order to obtain a high degree of system accuracy, it is desirable to run these tests many times to obtain dependable statistical data. The probes themselves should be manufactured using good quality control procedures so that the wear characteristics may be known and set forth, within acceptable tolerance limits, with a high degree of confidence.

For especially critical applications, a plurality of probes may be employed to give a better statistical indication of wear and/or to achieve improved results in systems where the fluid flow is not necessarily steady or uniform.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a method for measuring the volumetric rate of flow of a gas through a conduit, which method employs a precision orifice disposed in the gas flow path and means for measuring the pressure differential across the orifice whereby the pressure differential may be utilized in a standard formula to obtain the volumetric rate of flow, the improvement comprising:
   (A) determining analagously the wear to the precision orifice by measuring the wear to a probe fixed in the gas flow path upstream of the precision orifice;
   (B) deriving an orifice wear correction factor from the measured wear on the probe; and
   (C) including the correction factor in a modified standard formula to obtain a volumetric rate of flow value corrected for orifice plate wear.

2. The method of claim 1 in which the probe wear is determined by measuring the change in an electrical characteristic of the probe brought about by wear thereto.

3. The method of claim 2 in which the measured electrical characteristic is the resistance across at least a part of the probe volume.

4. The method of claim 3 in which:
   (A) a first resistance measurement is taken across a first probe portion facing upstream;
   (B) a second resistance measurement is taken across a second probe portion facing downstream; and
   (C) the difference between the first and second resistance measurements is utilized to develop the correction factor.

5. In apparatus for measuring the volumetric rate of flow of a gas through a conduit, which apparatus includes:
   (A) a precision orifice disposed in the gas flow path;
   (B) means for measuring the pressure differential across said orifice; and
   (C) means employing predetermined characteristics of said orifice and said measured pressure differential in a standard formula to obtain the volumetric rate of flow;
the improvement comprising:
   (D) a probe fixed in the gas flow path upstream of said precision orifice;
   (E) means for measuring wear to said probe;
   (F) means employing said measured probe wear for developing and orifice wear correction factor; and
   (G) means applying said correction factor to said standard formula;
whereby a volumetric rate of flow is obtained which is corrected against wear of said precision orifice.

6. The apparatus of claim 5 in which wear to said probe is measured indirectly by measuring a corresponding change in an electrical characteristic or said probe.

7. The apparatus of claim 6 in which said electrical characteristic comprises the resistance across at least a part of the volume of said probe.

8. The apparatus of claim 6 in which said probe includes:
   (A) a first portion facing upstream; and
   (B) a second portion facing downstream;
and in which said electrical characteristic comprises resistance across each of said first and second probe portions.

9. The apparatus of claim 8 which further includes:
   (A) a d-c bridge circuit comprising
      (i) a first resistor;
      (ii) a second resistor having one end connected at a first junction to one end of said first resistor;

(iii) said resistance across said first probe portion having a first side connected at a second junction to a second end of said first resistor;

(iv) said resistance across said second probe portion having a first side connected at a third junction to a second end of said second resistor and a second side connected at a fourth junction to a second side of said resistance of said first probe portion; and (v) a source of d-c connected across said first and fourth junctions;

whereby a change in the d-c potential measured between said second and third junctions represents a change in the ratio of said resistances across said first and second probe portions and is therefore representative of the wear to said first probe portion which is analagous to wear to said precision orifice.

10. The apparatus of claim 9 in which:
(A) said resistances across said first and second probe portions are substantially equal prior to exposure to wear; and
(B) said first and second resistors are substantially equal;

whereby said d-c potential measured between said second and third junctions is substantially zero prior to exposure to said first and second probe portions to wear such that a d-c potential other than zero subsequently observed between said second and third junction is analagous to wear to said precision orifice.

* * * * *